United States Patent
Srivastava (10) Patent No.: US 12,206,805 B2
(45) Date of Patent: Jan. 21, 2025

(54) BLOCKCHAIN RULES ENGINE

(71) Applicant: DLT Global, Inc., Toronto (CA)

(72) Inventor: Neeraj Srivastava, Toronto (CA)

(73) Assignee: KNNX Corp., Toronto (CA)

( * ) Notice: Subject to any disclaimer, the term of this patent is extended or adjusted under 35 U.S.C. 154(b) by 237 days.

(21) Appl. No.: 17/653,085

(22) Filed: Mar. 1, 2022

(65) Prior Publication Data

US 2023/0283488 A1    Sep. 7, 2023

(51) Int. Cl.
*H04L 9/00*          (2022.01)

(52) U.S. Cl.
CPC ....................... *H04L 9/50* (2022.05)

(58) Field of Classification Search
CPC .......... H04L 9/50; H04L 63/00; H04L 63/123
See application file for complete search history.

(56) References Cited

U.S. PATENT DOCUMENTS

| | | | |
|---|---|---|---|
| 10,521,196 B1* | 12/2019 | Wang | G06F 9/45529 |
| 11,507,562 B1* | 11/2022 | Luedtke | H04L 9/50 |
| 2018/0182052 A1* | 6/2018 | Panagos | G06Q 10/10 |
| 2018/0365201 A1* | 12/2018 | Hunn | G06F 40/143 |
| 2019/0394113 A1* | 12/2019 | Huang | H04L 9/3247 |
| 2020/0174937 A1* | 6/2020 | Yao | G06F 21/64 |
| 2021/0056095 A1 | 2/2021 | Srivastava | |
| 2021/0056637 A1* | 2/2021 | Downs | G16H 10/60 |
| 2021/0166245 A1* | 6/2021 | Novotny | H04L 67/1078 |
| 2021/0182423 A1* | 6/2021 | Padmanabhan | G06F 16/24573 |
| 2022/0283886 A1* | 9/2022 | Brown | H04W 12/10 |
| 2023/0300623 A1* | 9/2023 | Barnes | H04W 12/72 455/411 |
| 2023/0376501 A1* | 11/2023 | Srivastava | G06F 16/27 |
| 2024/0004851 A1* | 1/2024 | Zhang | G06F 16/2358 |
| 2024/0037463 A1* | 2/2024 | Ryali | G06Q 10/06311 |

(Continued)

OTHER PUBLICATIONS

Maxim, Orlovsky, "Towards Common Blockchain Architecture—an "ISO OSI for Blockchain" Primer", published on-line by Pandora Boxchain, Nov. 3, 2017, pp. 1-6.

(Continued)

*Primary Examiner* — Michael Won
(74) *Attorney, Agent, or Firm* — Michael P. Dunnam; CM Law (57) ABSTRACT

A Blockchain Rules Engine is provided as a pluggable service that depicts a real-world implementation of a Rules Engine that stores rules, transactions, and results on a blockchain for use by blockchain and non-blockchain applications. The Blockchain Rules Engine manages rules implemented by a client application that interacts with a blockchain platform that manages the blockchain. The Blockchain Rules Engine includes a language specific software developer's kit (SDK) that provides an interface to the client application and that exposes rule execution functionality to the client application, a rules engine application programming interface (API) layer that provides a rules engine API to the language specific SDK and that receives and processes commands from the language specific SDK, and a blockchain platform specific service layer that interacts with the blockchain platform and accepts input from the rules engine API layer to execute business logic implemented in the rules.

25 Claims, 5 Drawing Sheets

(56) References Cited

U.S. PATENT DOCUMENTS

2024/0261692 A1* 8/2024 Sliwka ................. H04L 9/3213

OTHER PUBLICATIONS

Wan, Zhiyuan, et al., "What Do Programmers Discuss About Blockchain? A Case Study on the Use of Balanced LDA and the Reference Architecture of a Domain to Capture Online Discussions About Blockchain Platforms Across Stack Exchange Communities", IEEE Transactions on Software Engineering, vol. 47, No. 7, Jul. 2021, pp. 1331-1349.

* cited by examiner

BLOCKCHAIN RULES ENGINE

TECHNICAL FIELD

The application is directed to a rules engine for implementing business processes on a blockchain and, in particular, to a blockchain rules engine implemented as a pluggable service for use by blockchain and non-blockchain applications.

BACKGROUND

Rules play an important and significant part of any process or system. Rules are the base on which business processes thrive. Rules can have many sources—legal regulation or company policies or any organization or group that involves processes and people. Rules are typically implemented as logic that determines outcomes. The rules can be used to implement a decision, or may be a calculation based on an event, a priority score, or other functions.

Rules have been part of technological systems and applications ever since they came into existence. In the first-generation systems and applications, business rules formed a part of the systems or application code base, where all the decisions, calculations and conditions were run. As the rules became complex and formed a large part of the code base, a rules engine was introduced in products from Pegasystems, Fair Isaac Corp, and ILOG in early 1990s. A rules engine is a separate system or application that enables precise decision making and is especially useful for complex dependencies in instances where regulatory and organizational rules change frequently requiring logic changes. A separate rules engine provides an easy way to include a new rule or to edit or deactivate rules.

Existing rules engine platforms have evolved from just being rules to an organized rules engine that is easy and quick to manage and use. Unfortunately, existing rules engines do not fit in the paradigm of the blockchain, and the rules and transactions from rules may be locked into the blockchain only at the intent of the developer.

SUMMARY

The systems and methods described herein address the needs in the art by providing a Blockchain Rules Engine as a pluggable service that depicts a real-world implementation of a rules engine that stores rules, transactions, and results on a blockchain for use by blockchain and non-blockchain applications. The Blockchain Rules Engine manages rules implemented by a client application that interacts with a blockchain platform that manages the blockchain. The Blockchain Rules Engine includes a language specific software developer's kit (SDK) that provides an interface to the client application and that exposes rule execution functionality to the client application, a rules engine application programming interface (API) layer that provides a rules engine API to the language specific SDK and that receives and processes commands from the language specific SDK, and a blockchain platform specific service layer that interacts with the blockchain platform and accepts input from the rules engine API layer to execute business logic implemented in the rules. Data operations are managed together by the blockchain platform specific service layer and the blockchain platform.

In sample configurations, the blockchain platform specific service layer includes a JavaScript Object Notation (JSON) condition parser that parses and evaluates conditions present in objects to which a rule is applied. Each instance of each type of functionality supported by the Blockchain Rules Engine is represented by a JSON document in a standard Blockchain Rules Engine format, where each JSON document is written to the blockchain using a same method and consensus as other blockchain transactions. Each modification or change in state to each type of functionality is represented by appending to the blockchain a complete updated version of the JSON document for the modified functionality.

In other sample configurations, the language specific SDK provides an interface to enable the client application to access rule execution functionality by a blockchain application developed in a programming language supported by the language specific SDK. Also, the interface provided by the rules engine API layer supports multi-tenants and multi-applications to interface with the blockchain rules engine. The rules engine API layer further accepts rules syntaxes and logic commands of the blockchain rules engine either from the language specific SDK or via a user interface console. The rules engine API layer also converts the syntaxes and logic commands into a format that can be passed on to the blockchain platform specific service layer via an interface to the blockchain platform specific service layer implemented on the blockchain platform.

In yet other sample configurations, the blockchain platform specific service layer describes an interface plus functionalities that are to be supported in every realization of the Blockchain Rules Engine, including a subset of features and functionalities that may be realized in either the blockchain platform specific service layer or on the blockchain platform. In sample configurations, the features include at least one of: function creation, function updating, function deletion, rule creation, rule updating, rule deletion, rule activation and deactivation, rule import and export, or rule rollback.

In further sample configurations, the condition parser of the blockchain platform specific surface layer parses pre-processor functions and post-processor functions for execution and storage of processing results on the blockchain. The pre-processor and post-processor functions may be linked with rules to change the behavior of the pre-processor and post-processor functions. The post-processor functions may include at least one of an on-pass post-processor function or an on-fail post-processor function that are performed after a rule has executed and a pass or fail result is produced by the executed rule.

In still further sample configurations, the blockchain platform specific service layer provides functionality that is implemented directly on the blockchain platform for rule-related functionalities that are to be accessed directly by a smart contract on the blockchain platform. Different rule execution functionality may be applied to different data objects, where the data objects may include at least one of a tenant, an application, a rule group, a function, or a rule. Each instance of each type of rule execution functionality may be represented by a JSON document in a format that is common to each type of rule execution functionality. Also, each JSON document may be written to the blockchain using a same method and consensus as other blockchain transactions. Each modification or change in state to rule execution functionality may be represented by appending to the blockchain a complete, updated version of a JSON document for the type of rule execution functionality.

In yet further sample configurations, a blockchain rules engine specification is provided that outlines syntax, interfaces and requirements that enables dynamic rule creation, dynamic rule modification, and dynamic deletion of rules in applications leveraging the rules engine API in the client application and that outlines how the blockchain rules engine stores rules data on the blockchain. The blockchain rules engine specification may specify how the blockchain rules engine stores a set of instructions that are carried out before rule execution on the blockchain. Also, the blockchain rules engine specification may implement multi-tenancy on the blockchain by enabling multiple tenants to create and manage rules and store credentials data and rule functions on the blockchain. The blockchain rules engine specification may further incorporate multiple levels of access control whereby, to perform any operation on a rule, the client application provides a tenant's credentials as well as the client application's credentials. The blockchain rules engine specification also may provide an application level hierarchy supported by the blockchain rules engine to utilize the rule execution functionality whereby the client application can use created rules and functions and store credentials and metadata on the blockchain. The blockchain rules engine specification also may implement a plug-in for communication of blockchain applications with the blockchain rules engine so as to establish inter-chain code communication and establish a connection for non-blockchain applications. In addition, the blockchain rules engine specification may provide the client application with the ability to execute created rules by providing functions to create a connection between the client application and the blockchain rules engine to perform rule execution. The blockchain rules engine specification also may comprise a set of function interfaces that define functions directly available to the client application code and a function implementation code that implements the function interfaces by translating calls to the blockchain rules engine specification into calls to the rules engine API.

The embodiments described herein also encompass computer systems and computer readable media coded with instructions for implementing the methods described throughout this disclosure. For example, the systems and methods described herein may be implemented on a computing platform in the cloud to provide functionality for accessing and storing data to a blockchain platform as described herein.

BRIEF DESCRIPTION OF THE DRAWINGS

The present disclosure is illustrated by way of example and not limitation in the figures of the accompanying drawings, in which like references indicate similar elements and in which.

DESCRIPTION

The following description with respect to FIGS. 1-5 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims.

Terminology

Application: An Application represents a component (service, or tool) that can be attached with Blockchain Rules Engine to utilize its functionalities. Applications are created and managed by Tenants. Applications, just like tenants, also have their own ID and secret. In order to do any operations on Rules and Functions, a Tenant also needs to provide an Application ID (and not the Application secret). This is because Rules and Functions do not directly belong to the Tenant, but the Application, which is directly owned by the Tenant. The reason an Application secret is not used in Rule and Function CRUD (create, read, update, and delete) operations is because those operations are not initiated by the Application itself, but by the Tenant. The Rule execution, however, is initiated directly by the Application and requires the Application secret.

Blockchain: A continuously growing list of records, called blocks, are linked and secured using cryptography. Each block typically contains a cryptographic hash of the previous block, a timestamp, and transaction data. The blockchain is designed to be inherently resistant to modification of the transaction data. For use as a distributed ledger, a blockchain is typically managed by a peer-to-peer network that collectively adheres to a protocol for validating new blocks. Once recorded, the data in any given block cannot be altered retroactively without the alteration of all subsequent blocks, which requires collusion of the network majority.

Function: A Function is a set of instructions in JSON-logic syntax that are present in a Rule. During a Rule creation, a Tenant can either reference an already created Function (created using the dedicated endpoint) in the Rule body or can write the Function directly in the Rule body. A Function's purpose can be better understood by learning about their types. Functions are of two types, described as follows:

Pre-Processor Function: The Pre-Processor function of a Rule is a pre-processor for the transaction object before it is fed to the Rule. It can be used in scenarios where the transaction object does not immediately have the data required for rule execution but contains a link to that data. In such a case, the Pre-Processor function can be utilized to convert the link to the data into the actual data. After that, the transaction object can be fed to the Rule.

Post-Processor Function: A Rule can have one on-pass Post-Processor and one on-fail Post-Processor function. They contain instructions that are returned to the Application after the Rule execution. When a transaction object is sent to Blockchain Rules Engine for Rule execution, all the Rules with the same value for "transaction type" as the transaction object are executed upon that transaction object. If a Rule fails, its on-fail Post-Processor is pushed as the response, and if it passes, the on-pass Post-Processor is pushed. Once all the Rules are executed, the complete response object (containing array response of on-fail and on-pass Post-Processors) is returned to the Application for their usage.

JSON: JavaScript Object Notation, a lightweight, text-based, human-readable data-interchange format.

Node.js®: A free open source server environment that executes JavaScript code outside of a browser. Node.js® is an asynchronous programming platform built on the Chrome browser's JavaScript runtime. More information about Node.js® may be found at "About Node.js®." Node.js, Node.js Foundation. Node.js™ and JSON are the technologies and standards involved in the blockchain aspects of Blockchain Rules Engine. Node.js is a free open source server environment that executes JavaScript code outside of a browser. It is an asynchronous programming platform built on the Chrome browser's JavaScript runtime.

Platform Admin: Tenants, in the Blockchain Rules Engine, first must be registered to create applications, rules, and functions, and to manage them as well. A role of Platform Admin, specially designed for this, only has the privilege to create and manage Tenants in the Blockchain Rules Engine.

Rules: A Rule is an object containing certain conditions, some functions and a transaction type. A Tenant can create them by using the endpoint provided by Blockchain Rules Engine (through a Software Development Kit (SDK)). A Rule can be applied upon a Transaction object, where "apply" means checking the transaction object against the conditions present in the Rule.

Smart Contract: A computer protocol that provides the general-purpose computation that takes place on the blockchain or distributed ledger. The smart contract Transactions may be simple or may implement sophisticated logic. The resulting transactions are typically transparent to ledger participants, trackable and irreversible.

Tenant: A Tenant represents any client (organization) using a Blockchain Rules Engine. Tenants have an ID and a secret that are used to carry out the elemental CRUD operations on applications, Functions and Rules. A Tenant is registered by the Platform Admin of the Blockchain Rules Engine.

Transaction: A JavaScript object, which has a "transaction type" key that is used to determine which Rules to apply upon it. A transaction object contains data upon which the Rule gets applied and produces a result. The data in the transaction object can be first modified by the Pre-Processor function (present in the rule) before the Rule is executed upon it. Transaction objects are named so because Blockchain Rules Engine was made with a concept to have hierarchy maintained at a transaction level. Transaction objects can have any data as long as they contain the "transaction type" key as a highest-level property.

Transaction-Type: A Transaction-Type represents a grouping of multiple Rules that are intended to be executed together for a transaction. A Transaction-Type categorization feature makes managing the Rules in the database much easier and intuitive.

Overview

Computer application designers, especially in large-scale enterprise settings, are increasingly incorporating existing distributed ledger technology (DLT) platforms into their solutions. These platforms offer rigorous data replication, rule enforcement, and immutability and auditability, but often require specialized skills to program and to operate. Subsystems may be used that enable the creation and operation of client applications by developers without specialized skills in the selected platform by combining an abstraction of communication a proximate DLT node (including the writing of both data and rules for that data) with a set of data and rule primitives that will support a broad range of potential DLT applications within a category. The primitives are typically constructed such that application developers may adapt them to specific use cases, extending them with attributes and additional data rules without requiring DLT platform skills, and without losing the rigorous rule enforcement that the DLT platform provides. Also, the interface(s) by which client application developers design and act on these primitives should fully abstract away any need for a technical understanding of the DLT platform.

Specific implementations may be dedicated subsystems of a single client application, reusable components for use with many client applications, or services that provide application enablement to many client applications. Other implementations may mediate the communication with one or many proximate DLT nodes, and those nodes may be drawn from a single or multiple DLT networks.

A sample subsystem may enable the indirect use of a Hyperledger Fabric DLT platform for a broad category or hypothetical workflow and information sharing applications, as well as several operational real-world realizations of such client applications. To implement such a subsystem, there are three key requirements:
1. A set of extensible generic data and action primitives that will be represented on the distributed ledger;
2. A set of rules operating on those primitives, embedded in the distributed ledger, that enforce both the endemic data rules of the subsystem plus permissible extensions of those rules as may be provided by the client application; and
3. A programming interface that requires no knowledge of the DLT platform to operate.

The resulting subsystem provides a suite of tools and a library that enables an ordinary user with knowledge of some application category and skills in some DLT platform to construct their own subsystem to support the creation of client applications in that category. The resulting code is implemented as middleware between an API network and a blockchain protocol whereby the user may interface to the blockchain consistently without extensive knowledge of the operation of the blockchain. In such applications, use case specific business rules from an upper layer are written and enforceable on the blockchain. New business rules need to be added from time to time to update the workflow without disrupting the blockchain capabilities and controls.

A Rules Engine provides an easy way to include a new rule or to edit or deactivate rules in such a subsystem. A Rules Engine's value comes from the inherent de-coupling of the rules from the application code. In addition to decoupling, Rules Engines enable the rules to be configured with ease without impacting any associated expert systems.

Some of the principles that are followed by Rules Engines are as follows:
1. Rules Engines should be highly 'pluggable and reusable,' meaning that the Rules Engine can be integrated to be used with any external application, thus making it usable in multiple applications. The business logic can be jointly used by various processes and client applications.
2. Rules Engines should be 'scalable,' meaning that any number of rules with any type of complexity can be configured in the Rules Engine.
3. Rules Engines are highly 'efficient' to promote fast, easy and accurate rule changes. Even the non-IT professionals should be able to configure (add, edit, delete, deactivate) the rules in a short time to make the Rules Engines highly cost effective.

4. Rules Engines should act as a 'source of truth,' meaning that all business rules and logic for an application process or system should be kept at one central storage.

The Blockchain Rules Engine described below achieves all of these principles.

The current energy around blockchain adoption is reminiscent of early adoption of the Internet. The potential exists to either re-live or avoid the same missteps with respect to logic management that weighed down applications and systems as they matured. Analogous to early websites and applications, cryptocurrency uses of blockchain featured relatively simple data structures and hard-coded business logic to govern them. However, the subsequent invention of "smart contracts" opened the door for rules and data of arbitrary complexity.

Enterprise use cases like supply chain logistics are putting information and logic on blockchain in volumes that rival traditional solutions, but with none of the standardized data management tools. With every programmer designing her own logic set within the application code base, the result once again is logic coupled tightly to the programs (smart contracts) that write it. A relational layer like the Blockchain Rules Engine described herein is needed to reduce this coupling.

Those skilled in the art will recognize that not every feature of a blockchain needs to be used in an enterprise application. Common situations include the use of blockchain platforms as a convenient way to achieve features like cryptographic tamper proofing and data replication. Also, enterprises may implement a blockchain network under their full control, with relaxed consensus rules or a centralized front end. Consortia with high levels of trust setting up blockchain networks together with strict smart contract enforcement for support staff may be used that allow administrators and internal auditors to update blockchain data directly on their own authority.

Transaction data and decision data stored in a smart contract has greater value in applications. Rule results and functions stored in the blockchain can be used subsequently in other functions or logic without being governed by consensus, thereby making the operations quick, efficient and reliable. The only requirement is the access to use the rule results and functions stored on the blockchain. It will be appreciated that the rules and functions stored on a blockchain can be efficiently read and processed by an application, rule, function, or system either inside or outside of the blockchain, for purposes that go beyond what was envisioned by the original smart contract programmers.

Sample Embodiment of Blockchain Powered Rules Engine

The Blockchain Rules Engine described herein is a pluggable service that depicts a real-world implementation of a Rules Engine that stores rules, its transactions and results on a blockchain, delivering the benefits mentioned above. As developed for a specific business realization, a Blockchain Rules Engine is a pluggable service that can be leveraged by blockchain as well as non-blockchain applications.

With an SDK developed as a Node Package Manager (NPM) package, a Blockchain Rules Engine in sample configurations can be used by any Node.js application thus making it a highly configurable Rules Engine that can be integrated with almost all applications. The Blockchain Rules Engine described herein has been designed for implementation across a variety of platforms and languages. This application describes one such implementation based on Hyperledger Fabric and the Node.js programming language. As will be appreciated by those skilled in the art, Hyperledger Fabric is an enterprise grade permissioned distributed ledger platform that offers modularity and versatility for a broad set of industry use cases.

Figure 1:
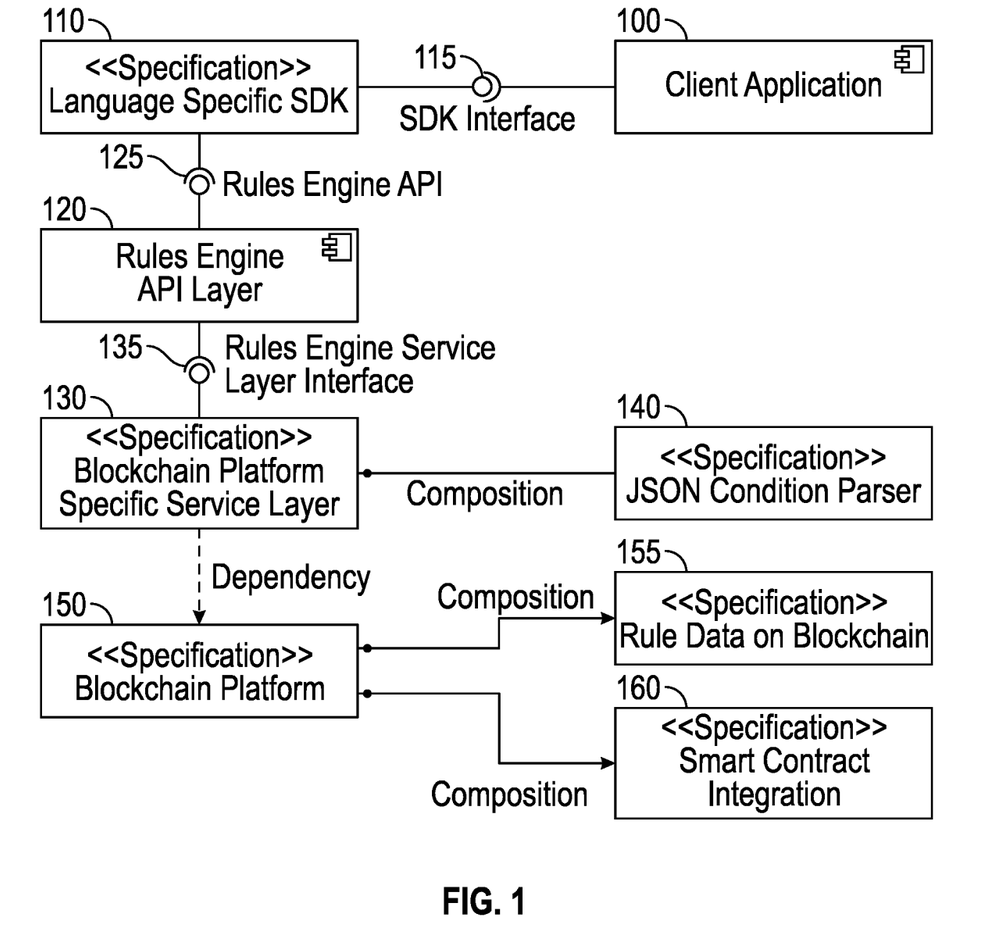
FIG. 1 is a general block diagram providing an overview of the Blockchain Rules Engine in an illustrative example.

The Blockchain Rules Engine will be described with respect to a set of specifications, interfaces, and core components that are intended to guide all implementations. FIG. 1 is a general block diagram providing an overview of the Blockchain Rules Engine in an illustrative example.

A Blockchain Rules Engine can be implemented for a variety of user programming languages and blockchain platforms. Parts of the system are common to all implementations, and parts are customized but follow a set of common specifications. FIG. 1 is an adapted component diagram showing these components and specifications. The common specifications are represented as components with the «specification» stereotype to indicate abstract requirements. Specifications are aspects that are expected to be implemented in a common way among all Blockchain Rules Engine implementations. The interfaces shown are also specifications in common for all implementations.

As illustrated in FIG. 1, the Blockchain Rules Engine interacts with a client application 100 that intends to utilize the Blockchain Rules Engine. Client application 100 can be any third-party application, service or tool. A language specific SDK 110 provides an interface 115 to the client application 100 to connect to the Blockchain Rules Engine services. The main functionality exposed by the language specific SDK 110 is the Rule execution functionality. A Blockchain Rules Engine API Layer 120 provides a Rules Engine API 125 that receives and processes the commands from the language specific SDK 110 and communicates with inner components to produce the desired result. A Blockchain Platform Specific Service Layer 130 is designed to work with Blockchain systems (Hyperledger Fabric in this example) and accepts input from the Rules Engine API layer 120 via Rules Engine Service Layer interface 135 to execute the business logic. To parse and evaluate the conditions present in Rule objects, the Blockchain Platform Specific Service Layer 130 may make use of a module called JSON Condition Parser 140.

The data operations in the system are managed together by the Blockchain Platform Specific Service Layer 130 and the Blockchain Platform 150. The exact division of work depends on the capabilities of the Blockchain Platform 150. The required functionality is given in additional detail by two sub-specifications including: Rule Data on Blockchain 155, which defines standardized data representations (JSON Schemas) and data operations that must be supported, and Smart Contract Integration 160, which specifies which Rule data features must be accessible from smart contracts.

Blockchain Rules Engine Language Specific SDKs 110

The Blockchain Rules Engine Language-specific SDKs 110 each provide an interface to access all features of the Blockchain Rules Engine (Rule Execution Functionality) by any blockchain application developed in a programming language (Node.js) popular with blockchain application developers. The Blockchain Rules Engine Language-specific SDKs 110 is a Node Package Manager (NPM) package that gets imported by a Node.js application to establish an interfacing connection with the Blockchain Rules Engine, thereby initiating the rule execution request from the interfaced client application(s) 100.

Blockchain Rules Engine API Layer 120 and UI Console

One of the core components of Blockchain Rules Engine is the Rules Engine API layer 120, which is used in all realizations of the Blockchain Rules Engine. The Rules Engine API layer 120 provides a user interface that is interactive and intuitive, supporting multi-tenants and multi-applications to interface with the Blockchain Rules Engine. The Rules Engine API layer 120 also provides a compilation and a summary of rules built through a user interface console (not shown). In addition, the Rules Engine API layer 120 accepts the Blockchain Rules Engine's rules syntaxes and logic commands either via a Blockchain Rules Engine API Layer 120 originating from the Language Specific SDK 110 or via a user interface console. The Rules Engine API layer 120 converts those syntaxes and logic commands into a format that can be passed on to the Blockchain Rules Engine Service Layer interface 135 that is implemented on the Blockchain Platform 150.

Blockchain Rules Engine Multitenancy

The Blockchain Rules Engine delivers multi-tenant support in that it provides the same Blockchain Rules Engine instance to be used by multiple applications. This specification of the tool allows more than one application in an enterprise or an ecosystem to build the most complex and powerful rules, whereby the enterprise or the ecosystem enable business logic interaction within all the interfacing applications. Remote access and virtualization features of multi-tenancy in the Blockchain Rules Engine provides more control and more flexibility to the applications using the Blockchain Rules Engine. Also, because of the multi-tenant feature in the Blockchain Rules Engine, virtualization and remote access features can be used completely within an enterprise.

Blockchain Rules Engine Service Layer Specification 130

The Blockchain Rules Engine's Service Layer specification 130 describes an interface, plus the functionalities that are to be supported in every realization of the Blockchain Rules Engine. Apart from covering the entire interface, this specification also covers the subset of features and functionalities that may be realized in either this Blockchain Rules Engine's Service Layer 130 or on the Blockchain Platform 150 itself. These features include:

Function Creation
Function Updating
Function Deletion
Rule Creation
Rule Updating
Rule Deletion
Rule Activation & Deactivation
Rule Import & Export
Rule Rollback The Blockchain Rules Engine's Service Layer 130 is implemented in Node.js and reused regardless of the SDK language or Blockchain Platform 150 targeted. Additional features may be targeted on Blockchain Platform 150 itself. These are described with respect to the Blockchain Platform specification below.

Blockchain Rules Engine Function Storage and Utilization

The Blockchain Rules Engine further provides a feature to store functions inside the blockchain. These functions are of two types: Pre-Processor Functions and Post-Processor Functions. These functions are written using a special JSON format that is then parsed by the Blockchain Rules Engine for execution.

These functions can be linked with Rules to change their behavior. Any linked Pre-Processor functions can be used to modify the provided input (from the client) of the Rule.

Figure 2:
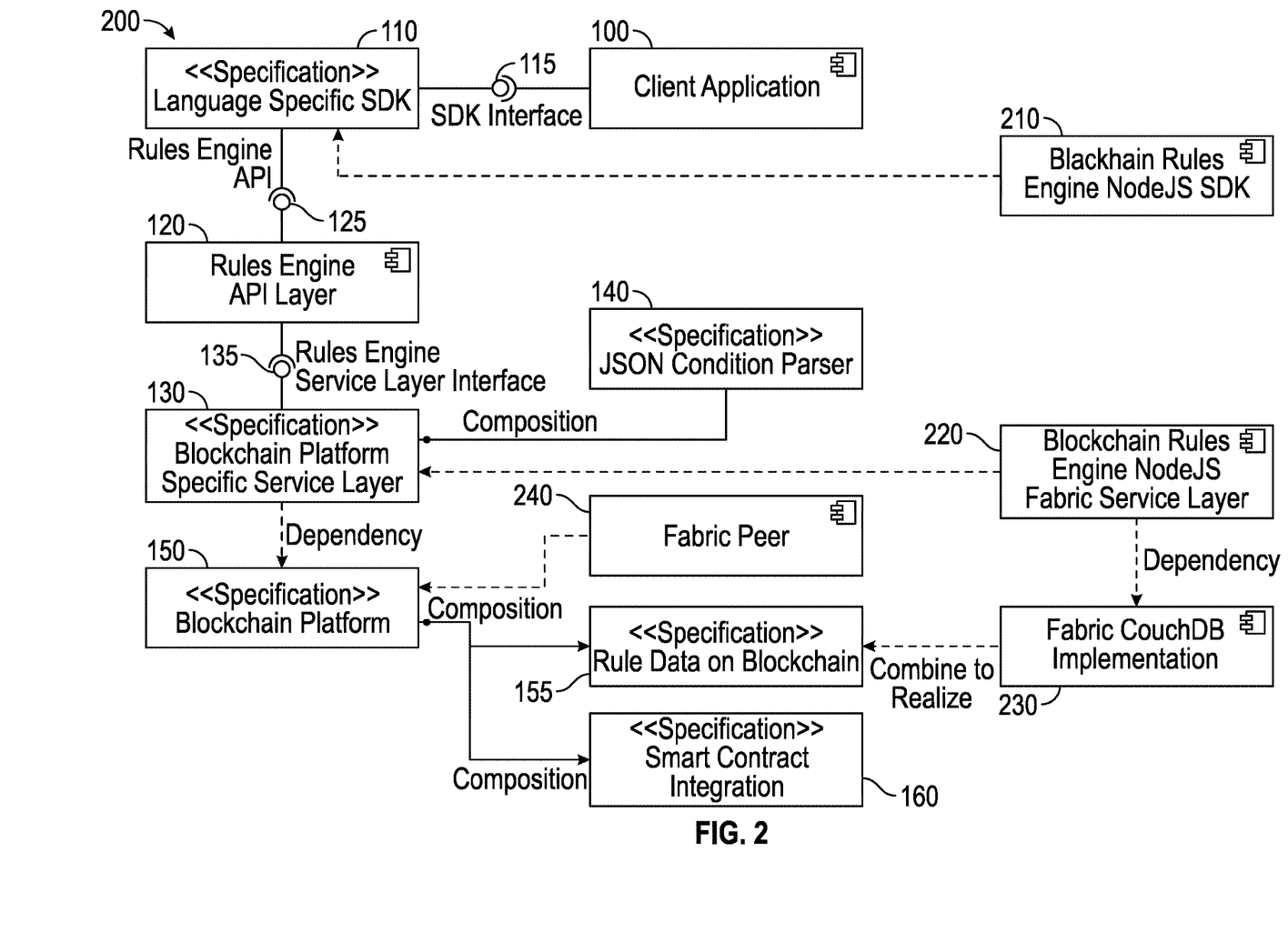
FIG. 2 is a detailed component diagram of an implementation of a sample configuration of Blockchain Rules Engine.

The Post-Processor functions are of two types: On-Pass Post-Processor functions and On-Fail Post-Processor functions. As their name signifies, they play their role after the Rule has executed and its result is produced (either pass or failure). Depending on the result, a corresponding Post-Processor function is returned to the caller which the caller can execute at its end. FIG. 2 below further explains these concepts.

Sample Configuration of Blockchain Rules Engine in Fabric/Nodejs

FIG. 2 is a detailed component diagram of an implementation of a sample configuration of Blockchain Rules Engine 200. Node.js is the SDK programming language used by language specific SDK 110 and Hyperledger Fabric is the Blockchain Platform 150 used. The model in FIG. 2 of the Blockchain Rules Engine 200 focuses on how the Fabric/Node.js implementation realizes the specifications outlined in FIG. 1 along with some additional functionalities.

A Blockchain Rules Engine Node.js Software Developer's Kit (SDK) component 210 realizes the user-language-specific functionality. The Rules Engine API Layer 120, Blockchain Platform Specific Service Layer 130, and the interfaces 115, 125, and 135 are common to all implementations, identical to FIG. 1. Below them, the Blockchain Rules Engine Node.js Fabric Service Layer 220 realizes the facade for all platform operations. Supporting the Blockchain Rules Engine Node.js Fabric Service Layer 220 directly through its dependency on the Blockchain Platform specification 150 is the Fabric CouchDB Implementation 230, which is directly accessed for certain indexing capabilities. In a Fabric realization, the schema-index modification and user privileges are partially implemented in the Blockchain Rules Engine Node.js Fabric Service Layer 220, which calls the Fabric CouchDB Implementation 230 directly.

Fabric Peer 240 hosts instances of ledgers and smart contracts for the blockchain network. The ledgers immutably record all transactions generated by smart contracts (which in Hyperledger Fabric are contained in a chain code or smart contract, which is a piece of code that accesses the ledger written in a supported programming language). Smart contracts and ledgers are used to respectively encapsulate the shared processes and shared information in a network. Through Fabric Peer 240, applications can execute chain codes to query or update a ledger.

Blockchain Rules Engine Blockchain Platform Specification 150

The Blockchain Rules Engine Blockchain Platform Specification 150 describes functionality that must be implemented directly on the blockchain platform for the rule-related functionalities to be usable by smart contracts on that blockchain platform. Like the blockchain platforms themselves, these implementations will differ greatly in approach. These specifications set out what will still be common, including a common JSON-based data format for the condition-data and schemas. The specifications are split into two categories: Rule data on Blockchain and Smart Contract Integration.

Rule Data on Blockchain Specification 155

The primary assets of Blockchain Rules Engine 200 are its rules. The Blockchain Rules Engine 200 employs a certain number of abstractions in data to achieve the advertised functionalities. These abstractions are defined as objects including Tenant, Application, Rule-Group, Function and Rule. There are significant differences in the way these concepts will be implemented for different blockchain platforms, but the following will be true on every platform:

Each instance of each of the five types of functionalities will be represented by a standalone JSON document in the standard Blockchain Rules Engine format that is common for each type of functionality.

These documents are written to the blockchain using the same method and consensus as other blockchain transactions.

Each modification or change in state to one of these elements is represented by appending to the blockchain a complete, updated version of the JSON document.

JSON Schema definitions for the five types of objects with copious details are formally specified in the design of the Blockchain Rules Engine 200.

Smart Contract Integration Specification 160

A key aspect of the Blockchain Rules Engine 200 is its ability to access most of the Rule functionality (mainly CRUD operations on the above-mentioned objects) directly from smart contracts. Like the SDK, a formal specification enumerates the functions that must be supported and provides a preferred form, naming, and semantics to maximize consistency across blockchain platform implementations. In other words, accessing the Blockchain Rules Engine 200 from smart contracts will be as consistent as possible across different blockchain platform implementations.

Blockchain Rules Engine Node.js SDK 210

The Blockchain Rules Engine Node.js Software Developer's Kit (SDK) 210 outlines the syntax, interfaces and requirements that enables dynamic rule creation in applications leveraging APIs exposed by the Blockchain Rules Engine—with the semantics and syntax already familiar to non-blockchain programmers and that is identical across all blockchain platforms. The Blockchain Rules Engine Node.js SDK 210 further enables dynamic modification and deletion of rules in applications interfaced with Blockchain Rules Engine APIs—again with the semantics and syntax already familiar to non-blockchain programmers and that is identical across all blockchain platforms.

The Blockchain Rules Engine Node.js SDK 210 outlines how the Blockchain Rules Engine 200 stores rules data on the blockchain. Rules, its execution results (Success/Error), and result transactions (Post-Processor functions) are all stored on the blockchain. Any modification done to the rules (its versioning) is also placed on the blockchain. The Blockchain Rules Engine Node.js SDK 210 further specifies how the Blockchain Rules Engine 200 stores Pre-Processor functions—the set of instructions that are carried out before rule execution—on the blockchain storage device. The Blockchain Rules Engine Node.js SDK 210 further implements multi-tenancy on the blockchain by enabling multiple tenants to create and manage rules on the blockchain. Tenants also store their credentials data, rule functions on the blockchain. In addition to multi-tenancy, the Blockchain Rules Engine Node.js SDK 210 provides an application level hierarchy supported by the Blockchain Rules Engine to utilize rule execution features. Applications can use created rules and functions and also may store credentials and metadata on the blockchain. In addition to rules storage on the blockchain, all the operations with respect to Tenants, Applications, Functions and Rules are logged securely on the blockchain.

The Blockchain Rules Engine Node.js SDK 210 further specifies the ability to create categories for the Rules based on transaction types. The Blockchain Rules Engine Node.js SDK 210 further supports creation of transaction types for the applications through API calls whereby users of the application create rules once transaction types are registered. Also, the Blockchain Rules Engine Node.js SDK 210 implements a plug-in for communication of blockchain applications with the Blockchain Rules Engine 200 establishing inter-chain code communication. Additionally, this plug-in may also establish a connection for non-blockchain applications.

Blockchain Rule Engine on Fabric with Node.js SDK

Based on the above specifications for the Blockchain Rules Engine 200, the Blockchain Rules Engine 200 may be implemented using an SDK for Node.js applications and Hyperledger Fabric for its blockchain platform in a sample configuration. Making rules data capabilities available to smart contracts on the blockchain platform required implementation of a full Blockchain Rules Engine 200 using smart contracts. The Blockchain Rules Engine 200 further implements logical data separation between Tenants and Applications and tight integration with the blockchain platform.

In a sample configuration, the Blockchain Rules Engine 200 is implemented using Node.js, Hyperledger Fabric and Apache Couch DB. Node.js is currently the world's most popular framework for web server-side development, while Hyperledger Fabric has an architecture that partially satisfies a number of the Blockchain Rules Engine's requirements. Apache CouchDB® is incorporated in Hyperledger Fabric as an option for a world state database. CouchDB® supports rich queries when chain code data values are modeled as JSON as Blockchain Rules Engine's Rule data.

Blockchain Rules Engine Fabric Implementation

Figure 3:
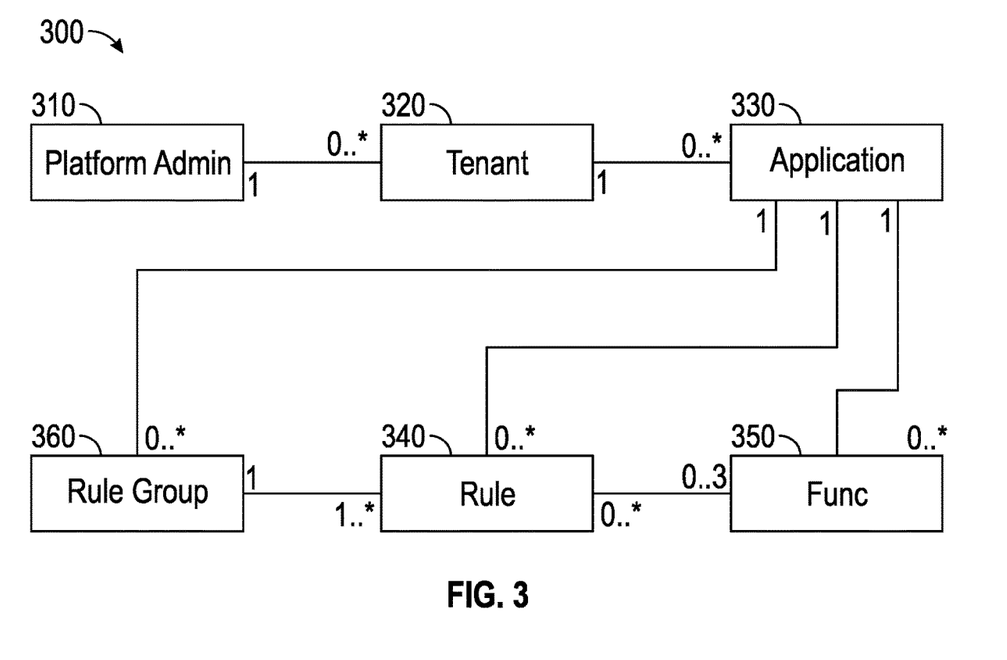
FIG. 3 provides a diagrammatical view of the Blockchain Rules Engine's rule data system objects in a sample realization.

FIG. 3 provides a diagrammatical view of the Blockchain Rules Engine's Rule data system objects in a realization 300. Blockchain Rules Engine's Rule data realization on Fabric involves three roles in total: Platform Admin 310, Tenant 320, and Application 330. Platform Admin 310 is enrolled at the time of product deployment. This role is responsible for enrolling Tenants 320 into the system 300. Tenants 320 have an ID and secret, which they can use to Create/Read/Update/Delete Rules 340 and Functions 350. Tenants 320 are also responsible for creating Applications 330. Applications 330 have their own ID and secret, which is required by the SDK to initiate Rule Execution requests with the product's API layer. Transaction-Type 360 may group multiple Rules 340 that are intended to be executed together for a transaction.

FIG. 3 explains the relationship between various database entities of the Blockchain Rules Engine 200. The numbers at either ends of the connecting links signify the relationship between the entities in terms of their numbers. For example, in FIG. 3, Platform Admin 310 is marked as "1" and Tenant 320 as "0**1", which means that one Tenant 320 can be related to only one Platform Admin 310, but one Platform Admin 310 can be related to any number of Tenants 320, starting from 0.

Blockchain Rules Engine Rule Data Access Control

Since the Blockchain Rules Engine 200 is a multitenant system, it incorporates multiple levels of access control. To perform any operation on a Rule (read or write), the caller has to provide Tenant's credentials as well as the Application's credentials. The hierarchy of bodies in Blockchain Rules Engine 200 is as follows:

Platform Admin>Tenant>Application>Functions and Rules.

Moreover, Tenants 320 can only be created by the Platform Admin 310, and Applications 330 can only be created by Tenants 320.

Blockchain Rules Engine Smart Contract Integration

The Blockchain Rules Engine's implementation on Hyperledger Fabric allows the installation of Smart Contracts 160 on the Blockchain platform. This way the business logic is split between the Blockchain Rules Engine Node.js Fabric Service Layer 220 and the Blockchain Platform 150 itself.

Blockchain Rules Engine Fabric Service Layer

The Blockchain Rules Engine Node.js Fabric Service Layer 220 accepts inputs from the API layer/SDK and translates them to action by invoking Blockchain Rules Engine chain code, and the CouchDB world state database 230.

Blockchain Rules Engine Node.js SDK

The Blockchain Rules Engine Node.js SDK 210 provides the client application 100 with the ability to execute the created Rules. Specifically, the Blockchain Rules Engine Node.js SDK 210 provides functions to create a connection with the Blockchain Rules Engine 200 and to perform Rule Execution.

Blockchain Rules Engine Fabric—Node.js SDK

Figure 4:
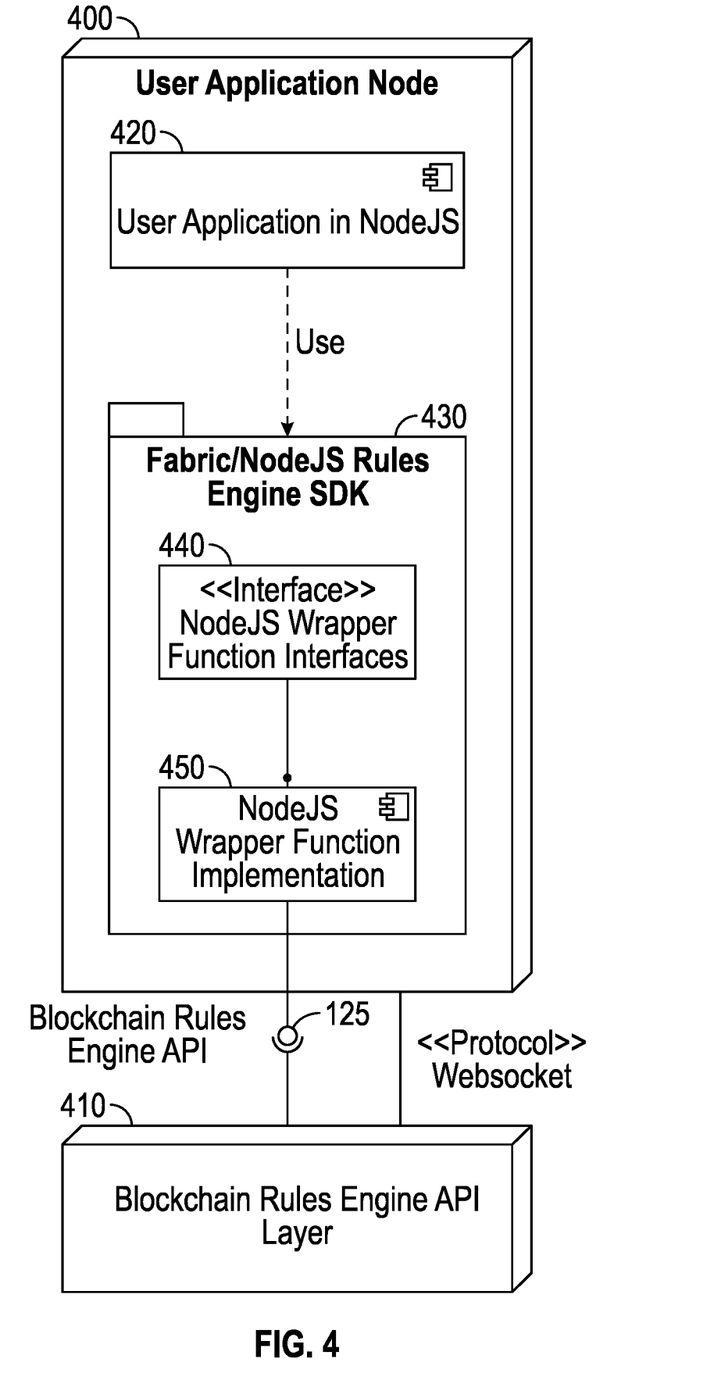
FIG. 4 is a diagram illustrating a user application node including interaction of the Blockchain Rules Engine's Fabric-Node.js SDK with a user's application and the execution environment in which they are both hosted.

FIG. 4 illustrates a User Application Node 400 including interaction of the Blockchain Rules Engine's Fabric-Node.js SDK 430 with a user's application 420 and the execution environment in which they are both hosted. User Application Node 400 covers a broad range of potential implementations, constrained by support for Node.js and the ability to be configured to communicate over a web socket of the Blockchain Rules Engine API 125 with a running instance of the Blockchain Rules Engine Webservice (API layer) 410, as shown at the top level of detail in the model of FIG. 4.

Drilling down into the User Application Node 400, the User Application in Node.js 420 is modeled as a component with a dependency on the Fabric/Node.js Blockchain Rules Engine SDK 430. Drilling down further, the Fabric/Node.js Blockchain Rules Engine SDK 430 is modeled in two parts. A set of Node.js Wrapper Function Interfaces 440 define the functions directly available to the user's application code. The Node.js Wrapper Function Interfaces 440 conform generally to the Language Specific SDK «specification» 110 introduced in FIG. 1. The Node.js Wrapper Function Implementation code 450 implements the interface, translating calls to the Fabric/Node.js Blockchain Rules Engine SDK 430 into calls to the Blockchain Rules Engine API 125.

Beyond the functions required by the Blockchain Rules Engine specifications, the Fabric/Node.js realization includes the Rule Execution ability. In addition to the features of Blockchain Rules Engine 200 noted above, the Fabric/Node.js version of FIG. 4 achieves Rule Data on the blockchain with Tenant-Application hierarchy and a programmer friendly SDK that provides client applications with features such as Rule Execution.

The description herein is provided with respect to Hyperledger® Fabric, but it will be appreciated by those skilled in the art that the techniques described herein also may be used with other blockchain networks such as AION, ArcBlock, EOS, NEO, Hyperledger® Sawtooth, NxT, QTUM, Quorum, Smilo, Tezos, TRON, Wanchain, or Zilliqa. The terminology used herein is with respect to the Hyperledger® Fabric blockchain network. Corresponding terms would be used in the context of the other blockchain networks, such as those mentioned.

Computer Embodiment

Figure 5:
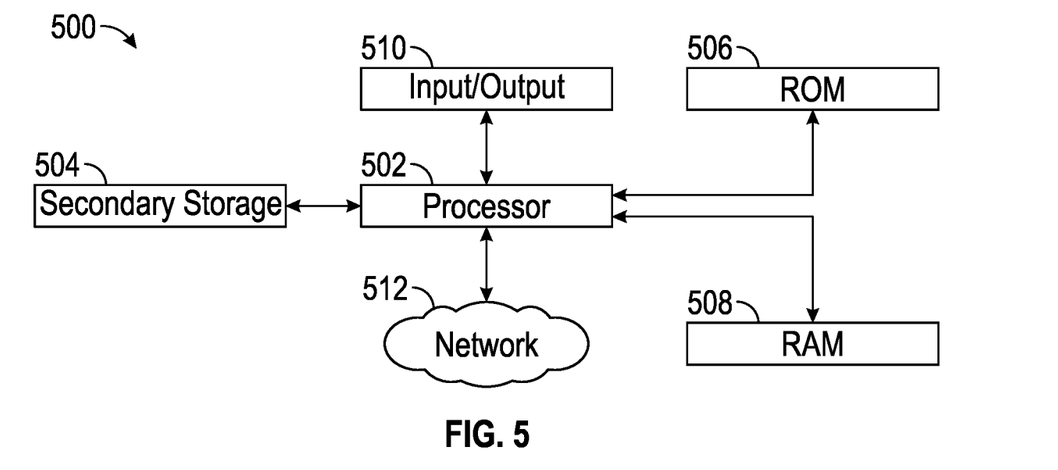
FIG. 5 is a block diagram of a typical, general-purpose computer that may be programmed into a special purpose computer suitable for implementing one or more embodiments of the blockchain rules engine disclosed herein.

FIG. 5 is a block diagram of a typical, general-purpose computer 500 that may be programmed into a special purpose computer suitable for implementing one or more embodiments of the Blockchain Rules Engine 200 disclosed herein. The Blockchain Rules Engine 200 described above may be implemented on any general-purpose processing component, such as a computer with sufficient processing power, memory resources, and communications throughput capability to handle the necessary workload placed upon it. The computer 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

The devices described herein may be configured to include computer-readable non-transitory media storing computer readable instructions and one or more processors coupled to the memory, and when executing the computer readable instructions configure the computer 500 to perform method steps and operations described above with reference to FIG. 1 to FIG. 4. The computer-readable non-transitory media includes all types of computer readable media, including magnetic storage media, optical storage media, flash media and solid-state storage media.

It should be further understood that software including one or more computer-executable instructions that facilitate processing and operations as described above with reference to any one or all of steps of the disclosure may be installed in and sold with one or more servers and/or one or more routers and/or one or more devices within consumer and/or producer domains consistent with the disclosure. Alternatively, the software may be obtained and loaded into one or more servers and/or one or more routers and/or one or more devices within consumer and/or producer domains consistent with the disclosure, including obtaining the software through physical medium or distribution system, including, for example, from a server owned by the software creator or from a server not owned but used by the software creator. The software may be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments may be implemented, at least in part, in digital electronic circuitry, analog electronic circuitry, or in computer hardware, firmware, software, or in combinations of them. These components may be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. Also, functional programs, codes, and code segments for accomplishing the techniques described herein may be easily construed as within the scope of the present disclosure by programmers skilled in the art. Method steps associated with the illustrative embodiments may be performed by one or more programmable processors executing a computer program, code or instructions to perform functions (e.g., by operating on input data and/or generating an output). Method steps may also be performed by, and apparatus may be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory may be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, which is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

The above-presented description and figures are intended by way of example only and are not intended to limit the illustrative embodiments in any way except as set forth in the appended claims. It is noted that various technical aspects of the various elements of the various exemplary embodiments that have been described above may be combined in numerous other ways, all of which are considered to be within the scope of the disclosure.

Accordingly, although exemplary embodiments have been disclosed for illustrative purposes, those skilled in the art will appreciate that various modifications, additions, and substitutions are possible. Therefore, the disclosure is not limited to the above-described embodiments but may be modified within the scope of appended claims, along with their full scope of equivalents.

What is claimed is:

1. A blockchain rules engine that manages rules implemented by a client application that interacts with a blockchain platform that manages a blockchain, comprising:
    a language specific software developer's kit (SDK) that provides an interface to the client application to enable dynamic rule creation, modification, or deletion by the client application and that exposes rule execution functionality to the client application, wherein rules implemented by the client application are represented as data objects to which rule execution functionality and a transaction type are applied, and wherein the data objects are stored on the blockchain in a format appropriate for each type of rule execution functionality of the respective data objects;
    a rules engine application programming interface (API) layer that provides a rules engine API to the language specific SDK and that receives and processes commands from the language specific SDK to create, modify, or delete rules to be enforced by the blockchain platform by creating, modify, or deleting data objects representing the rules; and
    a blockchain platform specific service layer that interacts with the blockchain platform and accepts input from the rules engine API layer to process the data objects to execute corresponding rules on the blockchain platform for enforcement by the blockchain.

2. The blockchain rules engine of claim 1, wherein the data objects comprises JavaScript Object Notation (JSON) documents, and wherein the blockchain platform specific service layer includes a JSON condition parser that parses and evaluates conditions present in data objects to which a rule execution functionality has been applied.

3. The blockchain rules engine of claim 2, wherein each instance of each type of rule execution functionality supported by the blockchain rules engine is represented by a JSON document whereby each JSON document is written to the blockchain using a same method and consensus as other blockchain transactions.

4. The blockchain rules engine of claim 3, wherein each modification or change in state to each type of rule execution functionality is represented by appending to the blockchain a complete updated version of the JSON document for the modified rule execution functionality.

5. The blockchain rules engine of claim 1, wherein the language specific SDK provides an interface to enable the client application to access rule execution functionality by a blockchain application developed in a programming language supported by the language specific SDK.

6. The blockchain rules engine of claim 1, wherein the interface provided by the rules engine API layer enables multi-tenants and multi-applications to interface with the blockchain rules engine.

7. The blockchain rules engine of claim 6, wherein the rules engine API layer accepts rules syntaxes and logic commands of the blockchain rules engine either from the language specific SDK or via a user interface console, and the rules engine API layer converts the syntaxes and logic commands into a format that can be passed on to the blockchain platform specific service layer via an interface to the blockchain platform specific service layer implemented on the blockchain platform.

8. The blockchain rules engine of claim 1, wherein the blockchain platform specific service layer describes an interface plus functionalities that are to be supported in every realization of the blockchain rules engine, including a subset of features and functionalities that may be realized in either the blockchain platform specific service layer or on the blockchain platform.

9. The blockchain rules engine of claim 8, wherein the features include at least one of: function creation, function updating, function deletion, rule creation, rule updating, rule deletion, rule activation and deactivation, rule import and export, or rule rollback.

10. The blockchain rules engine of claim 1, wherein the blockchain platform specific service layer includes a condition parser that parses pre-processor functions and post-processor functions for execution and storage of processing results on the blockchain.

11. The blockchain rules engine of claim 10, wherein the pre-processor and post-processor functions are linked with rules to change behavior of the pre-processor and post-processor functions.

12. The blockchain rules engine of claim 10, wherein the post-processor functions include at least one of an on-pass post-processor function or an on-fail post-processor function that are performed after a rule has executed and a pass or fail result is produced by the executed rule.

13. The blockchain rules engine of claim 1, wherein the blockchain platform specific service layer provides functionality that is implemented directly on the blockchain platform for rule-related functionalities that are to be used by a smart contract on the blockchain platform.

14. The blockchain rules engine of claim 1, wherein different rule execution functionality is applied to different data objects, the data objects including at least one of a tenant, an application, a rule group, a function, or a rule.

15. The blockchain rules engine of claim 14, wherein each instance of each type of rule execution functionality supported by the blockchain rules engine is represented by a JSON document in a format that is common to each type of rule execution functionality, and wherein each JSON document is written to the blockchain using a same method and consensus as other blockchain transactions.

16. The blockchain rules engine of claim 15, wherein each modification or change in state to rule execution functionality is represented by appending to the blockchain a complete, updated version of a JSON document for the type of rule execution functionality.

17. The blockchain rules engine of claim 14, wherein the rule execution functionality is accessible directly from a smart contract.

18. The blockchain rules engine of claim 1, further comprising a blockchain rules engine specification that outlines syntax, interfaces and requirements that enables dynamic rule creation, dynamic rule modification, and dynamic deletion of rules in applications leveraging the rules engine API in the client application and that outlines how the blockchain rules engine stores rules data on the blockchain.

19. The blockchain rules engine of claim 18, wherein the blockchain rules engine specification specifies how the blockchain rules engine stores a set of instructions that are carried out before rule execution on the blockchain.

20. The blockchain rules engine of claim 18, wherein the blockchain rules engine specification implements multi-tenancy on the blockchain by enabling multiple tenants to create and manage rules and store credentials data and rule functions on the blockchain.

21. The blockchain rules engine of claim 20, wherein the blockchain rules engine specification incorporates multiple levels of access control whereby, to perform any operation on a rule, the client application provides a tenant's credentials as well as the client application's credentials.

22. The blockchain rules engine of claim 18, wherein the blockchain rules engine specification provides an application level hierarchy supported by the blockchain rules engine to utilize the rule execution functionality whereby the client application can use created rules and functions and store credentials and metadata on the blockchain.

23. The blockchain rules engine of claim 18, wherein the blockchain rules engine specification implements a plug-in for communication of blockchain applications with the blockchain rules engine so as to establish inter-chain code communication and establish a connection for non-blockchain applications.

24. The blockchain rules engine of claim 18, wherein the blockchain rules engine specification provides the client application with the ability to execute created rules by providing functions to create a connection between the client application and the blockchain rules engine to perform rule execution.

25. The blockchain rules engine of claim 18, wherein the blockchain rules engine specification comprises a set of function interfaces that define functions directly available to the client application code and a function implementation code that implements the function interfaces by translating calls to the blockchain rules engine specification into calls to the rules engine API.

* * * * *